United States Patent
Cremona et al.

(10) Patent No.: US 10,092,895 B2
(45) Date of Patent: Oct. 9, 2018

(54) PROCESS FOR CATALYTIC DECOMPOSITION OF NITROGEN PROTOXIDE

(71) Applicant: SUED-CHEMIE CATALYSTS ITALIA S.R.L., Novera (IT)

(72) Inventors: Alberto Cremona, Castell'Arquato (IT); Edoardo Vogna, Novara (IT)

(73) Assignee: SUED-CHEMIE CATALYSTS ITALIA S.R.L., Novera (IT)

(*) Notice: Subject to any disclaimer, the term of this patent is extended or adjusted under 35 U.S.C. 154(b) by 0 days.

(21) Appl. No.: 15/370,868

(22) Filed: Dec. 6, 2016

(65) Prior Publication Data

US 2017/0113208 A1   Apr. 27, 2017

Related U.S. Application Data

(63) Continuation-in-part of application No. 12/523,883, filed as application No. PCT/IB2008/000149 on Jan. 23, 2008, now abandoned.

(30) Foreign Application Priority Data

Jan. 23, 2007 (IT) .............................. MI2007A0096

(51) Int. Cl.
| | |
|---|---|
| *B01J 23/889* | (2006.01) |
| *B01J 37/02* | (2006.01) |
| *B01J 23/00* | (2006.01) |
| *B01J 21/04* | (2006.01) |
| *B01J 35/00* | (2006.01) |
| *B01J 37/08* | (2006.01) |
| *B01D 53/86* | (2006.01) |

(52) U.S. Cl.
CPC ...... *B01J 23/8892* (2013.01); *B01D 53/8628* (2013.01); *B01J 21/04* (2013.01); *B01J 23/002* (2013.01); *B01J 35/0006* (2013.01); *B01J 37/024* (2013.01); *B01J 37/0236* (2013.01); *B01J 37/088* (2013.01); *B01D 2255/2063* (2013.01); *B01D 2255/2073* (2013.01); *B01D 2255/20761* (2013.01); *B01D 2255/40* (2013.01); *B01D 2257/402* (2013.01)

(58) Field of Classification Search
None
See application file for complete search history.

(56) References Cited

U.S. PATENT DOCUMENTS

| | | | |
|---|---|---|---|
| 5,736,482 A | 4/1998 | Durand et al. | 502/303 |
| 6,056,928 A | 5/2000 | Fetzer et al. | 423/235 |
| 6,683,021 B2 | 1/2004 | Cremona et al. | 502/303 |
| 6,743,404 B1 | 6/2004 | Schumacher et al. | 423/239.1 |
| 2002/0064492 A1 | 5/2002 | Cremona et al. | |
| 2004/0179986 A1 | 9/2004 | Burckhardt et al. | |
| 2006/0088469 A1 | 4/2006 | Perez-Ramirez | 423/701 |
| 2008/0044334 A1 | 2/2008 | Pieterse et al. | 423/239.2 |

FOREIGN PATENT DOCUMENTS

| | | | |
|---|---|---|---|
| EP | 1197259 | * | 2/2001 |
| EP | 1 197 295 A2 | | 4/2002 |
| EP | 1 413 349 A | | 4/2004 |
| EP | 1413349 | * | 4/2004 |
| EP | 1 504 805 A | | 2/2005 |

OTHER PUBLICATIONS

Alini, Stefano, et al. "Development of new catalysts for N2O decomposition from adipic acid plant". Applied Catalysis B: Environmental, 323-329, 70 (2007).
International Search Report related to PCT/IB2008/000149.
Office Action for U.S. Appl. No. 12/523,883, dated Jun. 7, 2016.

* cited by examiner

*Primary Examiner* — Sheng H Davis
(74) *Attorney, Agent, or Firm* — Husch Blackwell LLP

(57) ABSTRACT

A process for removing nitrogen protoxide from gas mixtures which 5 contain it, comprising contacting with a catalyst which contains mixed oxides of copper, manganese and rare earth metals in an amount expressed as percentage by weight of CuO, MnO and rare earth metal oxide in the lowest state of valency of 20-45% CuO, 50-60% MnO, and 5-20% rare earth metal oxide.

7 Claims, No Drawings

PROCESS FOR CATALYTIC DECOMPOSITION OF NITROGEN PROTOXIDE

This application is a continuation-in-part of and claims priority to U.S. application Ser. No. 12/523,883, filed Jul. 25, 2009, which is a 371 of PCT/IB2008/000149, dated Jan. 23, 2008.

BACKGROUND OF THE INVENTION

The present invention relates to a process for catalytic decomposition of nitrogen protoxide ($N_2O$) to nitrogen and oxygen and to its use for removing protoxide from gas mixtures which contain it, in particular for removal from the emissions of nitric acid and adipic acid plants.

Nitrogen protoxide is a harmful greenhouse gas, much more powerful 1 than carbon dioxide; moreover, it takes part in the stratosphere in the reactions which lead to destruction of the ozone layer.

The main industrial sources of the generation of nitrogen protoxide are plants for producing nitric acid and adipic acid (a monomer used in the preparation of nylon 6,6 and 6,12).

Nitrogen protoxide is present in the emissions from adipic acid plants in considerable amounts: a typical composition comprises, in percentage by volume: 30% $N_2O$, 2% $CO_2$, 2.5% $H_2O$, 8-12% $O_2$, 50-150 ppm NOx.

The emissions of nitric acid plants generally contain 300-1700 ppm $N_2O$, 100-2000 ppm NOx, 1-4% $O_2$, the rest being nitrogen.

The emission of $N_2O$ from nitric acid and adipic acid plants is predicted to grow by approximately 16% over the period 2005-2020.

Several catalysts are known which are used to decompose $N_2O$. The main ones are constituted by noble metals supported on metallic oxides of different kinds, zeolites substituted with transition metal ions or on which metallic oxides and anionic clays are supported, such as for example hydrotalcites constituted by mixed hydroxides with a stratified structure in which exchangeable or non-exchangeable anions of different kinds and water molecules are inserted between two layers.

All these catalysts have the drawback of not being thermally stable: the noble metals supported on metallic oxides because at high temperatures the particles of the metal tend to sinter, with consequent deactivation of the catalyst; the clays and the zeolites because their structure tends to collapse and thus loses its initial catalytic properties.

Catalysts are known (U.S. Pat. No. 5,705,136) which are constituted by oxides such as MnO, CuO, NiO and CoO supported on MgO, CaO, ZnO $TiO_2$, $Al_2O_3$—ZnO, $Al_2O_3$—$TiO_2$, and the like. Preferably, the catalysts contain CoO supported on MgO.

$N_2O$ conversions are high.

Structures such as hydrotalcite, such as for example $Cu_3Mg_5Al_2(OH)_{20}CO_3$ $3H_2O$, $Mn_3$ $Mg_5Al_2(OH)_{20}$ $CO_3H_2O$, can also be used.

It has now been found unexpectedly that the catalysts specified hereafter have a high catalytic activity in the decomposition of $N_2O$ to nitrogen and oxygen and a satisfactory thermal stability, and are able to keep their activity unchanged for long periods of time.

The catalysts comprise mixed oxides of copper, manganese and rare earth metals, which are present in the following composition, expressed in percentage by weight of CuO, MnO and oxide of rare earth metals in which the metal is present in the lowest valency state: 50-60% MnO, 20-45% CuO, 5-20% rare earth metal oxide.

Further the invention comprises a process for removing nitrogen protoxide from gas emission from adipic acid plants comprising contacting with a catalyst which comprises mixed oxides of copper, manganese and lanthanum having a composition expressed as percentage by weight of 55-60% MnO, 25-40% CuO, 9-14% $La_2O_3$." In this process, the gas emissions released by the adipic acid plants may be made to pass over a fixed catalyst bed at temperatures from 600° C. to 700° C."

DETAILED DESCRIPTION OF THE INVENTION

The preferred rare earth metal oxides are lanthanum and cerium oxides.

A preferred composition comprises lanthanum oxide in an amount of 8-16% by weight expressed as $La_2O_3$.

The mixed oxides which constitute the active components of the catalysts have the characteristic of being p-type semiconductors, in which conductivity increases exponentially with the temperature according to an Arrhenius-type rule and in which the charge vectors are constituted by electron vacancies. In these oxides, the lattice oxygen takes part in the oxidation reactions.

The mixed oxides axe used on porous metallic supports such as alumina, silica-alumina, titanium dioxide, magnesium oxide. Gamma alumina, in the form of microspheroidal particles with a diameter of 30-80 pm, is the preferred support for reactions performed in particular in a fluid bed. The surface area (BET) of the catalyst supported in gamma alumina ranges generally from 80 to 150 $m^2/g$. The oxides are preferably present in the support in an amount of 10-30% by weight.

In the fixed-bed reactions used in the removal of nitrogen protoxide from the emissions of nitric acid and adipic acid plants, it is preferred to use supports which have a definite geometric shape, such as perforated cylindrical granules or three-lobed granules provided with through holes at the lobes. The size of the granules is 3-10 mm in height and their circumference ranges from 3 to 10 mm.

The catalysts used in the process according to the present invention are disclosed in EP 1 197 259 B1, in which they are used to oxidize volatile organic substances and in which the use for decomposition of $N_2O$ to nitrogen and oxygen is not provided or mentioned at all.

In order to prepare the catalysts, the support is first impregnated with an aqueous solution of a salt of lanthanum or cerium or other rare earth metal or mixtures thereof, followed by drying of the support and then calcining at temperatures preferably from 450 to 600° C. The support thus treated is then impregnated with a solution of a salt of copper and manganese, subsequently dried and then calcined at temperatures from 300 to 500° C.

Any salt of the metals mentioned above which is soluble in water can be used; preference is given to nitrates, formates and acetates.

The preferred impregnation method is provided in dry conditions, i.e., by using a volume of salt solution which is equal to, or smaller than, the volume of the pores of the support.

The decomposition of $N_2O$ is performed at temperatures from 400 up to 900° C. The higher temperatures are used as the $N_2O$ content increases. In the case of emission from nitric acid plants, the preferred temperature is from 600° to 800° C.

The spatial velocities range from 3000 to 60,000 h$^{-1}$. The N$_2$O content in the mixtures varies from ppm to percentages by volume of more than 20%. When working in the conditions indicated above, any NOx oxides that are present remain unchanged.

The following examples are provided merely by way of non-limiting illustration of the invention.

Examples 1-4

The catalyst used in the following examples had the following composition, expressed as a percentage by weight of:
La$_2$O$_3$=9.2
MnO=53.4
CuO=37.4

Preparation was performed by impregnating gamma alumina with an aqueous solution of lanthanum nitrate La(NO$_3$)$_3$.

The support was then dried at 110° C. and then calcined at 600° C. The calcined support was impregnated with an aqueous solution of manganese nitrate (Mn(NO$_3$)$_3$) and copper nitrate (Cu(NO$_3$)$_2$) and then dried at 120-200° C. and calcined at 450° C.

A volume of solution equal to 100% of the volume of the pores of the alumina was used for impregnation.

The oxides were present in the support in an amount of 26% by weight. The surface area of the catalyst (BET) was 110 m$^2$/g and the porosity was 0.40 cm$^3$/g.

Before the test, the catalyst was appropriately milled and screened.

The light-off activity of the catalyst, i.e., the temperature of the gas stream at which the catalyst decomposes 50% of the nitrogen protoxide that is present, and the temperature of total decomposition of the protoxide were to 900° C. The higher temperatures are used as the N$_2$O content increases. In the case of emission from nitric acid plants, the preferred temperature is from 600° to 800° C.

The spatial velocities range from 3000 to 60,000 h$^{-1}$. The N$_2$O content in the mixtures varies from ppm to percentages by volume of more than 20%. When working in the conditions indicated above, any NOx oxides that are present remain unchanged.

Example 5

The catalyst used in this example had the following composition, expressed as a percentage by weight of:
La$_2$O$_3$=10%
MnO=53%
CuO=38%

Preparation was performed as in Examples 1-4 and tested accordingly.

Example 6

The catalyst used in example 6, a comparative example, had the following composition, expressed as a percentage by weight of:
La$_2$O$_3$=10%
MnO=45%
CuO=45%

Preparation was performed as in Example 1-4 and tested accordingly.

The results obtained are given in the table.

TABLE

| Operating conditions | Unit | Example 1 | Example 2 | Example 3 | Example 4 | Example 5 | Example 6 |
|---|---|---|---|---|---|---|---|
| N$_2$0 | % volume | 30 | 13 | 8.5 | 1200 ppmv | 13 | 13 |
| Oxygen | % volume | | 5 | 5 | 1 | 5 | 5 |
| Helium | | remainder | remainder | remainder | remainder | remainder | remainder |
| Reaction start temperatures | ° C. | 445° | 430° | 430° | 300° | 300° | 450° |
| 50% conversion | ° C. | 503° | 520° | 520° | 500° | 490° | 550° |
| 100% conversion | ° C. | 576° | 620° | 60° | 56° | 590° | 650° |
| GHSV | h$^{-1}$ | 10,000 | 12,500 | 10,000 | 10,000 | 1250 | 1250 |
| Total flow-rate | Ncc/min | 200 | 200 | 200 | 200 | 200 | 200 |

(a) 8000 ppmv of NO were present in the reaction mix

Example 5 illustrates a specific combination of manganese, copper and lanthanum oxides in defined ranges, namely, 55-60 wt % MnO, 25-40 wt % CuO, 9-14 wt % La$_2$O$_3$. These specific ranges represent a critical feature of the catalyst.

By comparing the catalyst efficiency of a catalyst according to the subject invention and the catalyst efficiency of a catalyst which comprises the same oxides but in percentage ranges falling—even by a very little amount—outside the specific limits indicated, it results that the efficiency of the first catalyst is very high, while the efficiency of the second catalyst is remarkably lower.

The composition of the high performance catalysts is 55-60 wt % MnO, 25-40 wt % CuO, 9-14 wt % La$_2$O$_3$. The low performance catalysts differ from the high performance catalysts in view of their CuO and MnO content, which is few percentage points higher than the upper limit and/or few percentage points lower than the lower limit.

For example, catalysts with low performance have the same La$_2$O$_3$ composition as the high performance catalysts but comprise 45 wt % CuO (the upper limit for the high performance catalysts being 40 wt %) and 45 wt % MnO (the lower limit for the high performance catalysts being 55 wt %).

It follows that the CuO and MnO ranges of the high performance catalysts are actually critical because they result in a high catalytic efficiency, while catalysts whose CuO and MnO contents are even a little outside those CuO and MnO ranges show a very poor performance.

The catalysts of the subject invention use only one fixed catalyst bed, while the catalyst used in the prior art requires at least two fixed catalyst beds to control the high exothermia of the $N_2O$ decomposition reaction. The difference in the subject invention with the prior art is a consequence of the critical narrow range of the catalysts.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

The invention claimed is:

1. A process for removing nitrogen protoxide from gas emissions from adipic acid plants in a one-bed procedure comprising the single step of contacting the gas emissions with a compound which comprises mixed oxides of copper, manganese and lanthanum having a composition expressed as percentage by weight of 55-60% MnO, 25-40% CuO, 9-14% $La_2O_3$, and thereby providing a catalyst with high catalytic activity in the decomposition of $N_2O$ to oxygen and nitrogen and removing $NO_X$.

2. The process according to claim 1, wherein gas emissions released by the adipic acid plants are made to pass over a fixed catalyst bed at temperatures from 600° C. to 700° c.

3. The process according to claim 2, wherein the emissions released by the adipic acid plants are made to pass over a fixed catalyst bed kept at temperatures from 600 to 700° c.

4. The process according to claim 1, wherein the catalyst is supported on a porous metallic oxide.

5. The process according to claim 4 wherein the catalyst is supported on microspheroidal gamma alumina.

6. The process according to claim 5, wherein the catalyst is supported on granules which have the shape of perforated cylinders or with one or more lobes having through holes parallel to the axis of the granule.

7. The process for preparing the catalyst according to claims 4 or 5 or 6, wherein the support is first impregnated with an aqueous solution of a salt of lanthanum or other rare earth metal, dried and then calcined at a temperature from 450 to 600° C. and subsequently impregnated with a solution of a copper and manganese salt, and then, after drying, calcined at temperatures from 300 to 500° C.

* * * * *